(12) United States Patent
Desjardins

(10) Patent No.: US 12,253,162 B2
(45) Date of Patent: Mar. 18, 2025

(54) TORQUE SENSOR FOR AN AIRCRAFT PROPULSION SYSTEM GEARBOX ASSEMBLY

(71) Applicant: Pratt & Whitney Canada Corp., Longueuil (CA)

(72) Inventor: Michel Desjardins, St Hubert (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/143,972

(22) Filed: May 5, 2023

(65) Prior Publication Data

US 2024/0369137 A1    Nov. 7, 2024

(51) Int. Cl.
*F16H 59/16* (2006.01)
*F02C 7/36* (2006.01)

(52) U.S. Cl.
CPC ............... *F16H 59/16* (2013.01); *F02C 7/36* (2013.01); *F05D 2260/40311* (2013.01)

(58) Field of Classification Search
CPC ............... F16H 2048/207; F16H 59/16; F05D 2260/40311
See application file for complete search history.

(56) References Cited

U.S. PATENT DOCUMENTS

| | | | |
|---|---|---|---|
| 6,336,879 B1 * | 1/2002 | Schmid | F16H 61/66272 474/18 |
| 7,392,714 B2 * | 7/2008 | Maguire | G01L 3/1485 192/105 A |
| 10,473,554 B2 | 11/2019 | Larson | |
| 10,975,717 B2 | 4/2021 | Moniz | |
| 11,174,782 B2 | 11/2021 | Desjardins | |
| 11,174,916 B2 | 11/2021 | Desjardins | |
| 11,339,725 B2 | 5/2022 | Simon | |
| 11,906,017 B1 | 2/2024 | Durocher | |
| 2010/0241331 A1 * | 9/2010 | Duke | F02C 7/36 701/100 |
| 2018/0030904 A1 * | 2/2018 | Meunier | F02C 7/232 |

(Continued)

FOREIGN PATENT DOCUMENTS

| | | |
|---|---|---|
| EP | 3686606 B1 | 5/2023 |
| GB | 861158 A | 2/1961 |

OTHER PUBLICATIONS

EP Search Report for EP Patent Application No. 24173887.1 dated Sep. 10, 2024.

*Primary Examiner* — David P. Olynick
(74) *Attorney, Agent, or Firm* — Getz Balich LLC

(57) ABSTRACT

An assembly for an aircraft propulsion system includes a planetary gear assembly, a torque sensor, and a controller. The planetary gear assembly includes a sun gear, a plurality of planet gears, a first ring gear, and a second ring gear. Each planet gear of the plurality of planet gears includes a main gear, a first lateral gear, and a second lateral gear. The main gear is engaged with the sun gear, the first lateral gear is engaged with the first ring gear, and the second lateral gear is engaged with the second ring gear. The torque sensor assembly contacts the second ring gear. The torque sensor assembly is configured to generate an output signal corresponding to an axial deflection of the second ring gear. The controller is configured to calculate a torque applied to the output shaft by the planetary gear assembly using the output signal.

19 Claims, 5 Drawing Sheets

(56) References Cited

U.S. PATENT DOCUMENTS

| | | |
|---|---|---|
| 2018/0230902 A1* | 8/2018 | Desjardins ................ F16H 1/28 |
| 2019/0285029 A1 | 9/2019 | Nick |
| 2020/0300340 A1* | 9/2020 | Desjardins ................ F16H 1/28 |
| 2020/0332721 A1 | 10/2020 | Simon |
| 2021/0388769 A1 | 12/2021 | Beck |
| 2021/0388770 A1 | 12/2021 | Hrubec |
| 2022/0235699 A1 | 7/2022 | Desjardins |
| 2024/0159608 A1 | 5/2024 | Ertas |
| 2024/0369137 A1 | 11/2024 | Michel |

* cited by examiner

TORQUE SENSOR FOR AN AIRCRAFT PROPULSION SYSTEM GEARBOX ASSEMBLY

TECHNICAL FIELD

This disclosure relates generally to aircraft propulsion systems and, more particularly, to speed-changing gearbox assemblies for aircraft propulsion systems.

BACKGROUND OF THE ART

Aircraft propulsion systems may include a speed-changing gearbox to drive one or more rotational loads. For example, an aircraft propulsion system may include a reduction gearbox (RGB) to drive a propeller at a reduced rotational speed relative to a turbine of a gas turbine engine. A rotation speed of the rotational loads may be controlled based on a measured torque applied by the RGB to the rotational loads. Various systems and methods are known in the art for measuring torque. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for an aircraft propulsion system includes an output shaft, a planetary gear assembly, a torque sensor, and a controller. The planetary gear assembly is configured to drive rotation of the output shaft. The planetary gear assembly includes a sun gear, a plurality of planet gears, a first ring gear, and a second ring gear. The sun gear is rotatable about a rotational axis. Each planet gear of the plurality of planet gears includes a main gear, a first lateral gear, and a second lateral gear. The main gear is engaged with the sun gear, the first lateral gear is engaged with the first ring gear, and the second lateral gear is engaged with the second ring gear. The first ring gear is axially spaced from the second ring gear relative to the rotational axis. The torque sensor assembly contacts the second ring gear. The torque sensor assembly is configured to generate an output signal corresponding to an axial deflection of the second ring gear. The controller is connected in signal communication with the torque sensor assembly. The controller includes a processor in communication with a non-transitory memory storing instructions, which instructions when executed by the processor, cause the processor to: calculate a torque applied to the output shaft by the planetary gear assembly using the output signal.

In any of the aspects or embodiments described above and herein, the torque sensor assembly may be disposed at an axial side of the second ring gear.

In any of the aspects or embodiments described above and herein, the first ring gear and the second ring gear may be rotationally fixed relative to the rotational axis.

In any of the aspects or embodiments described above and herein, the torque sensor assembly may include a pressure sensor connected in signal communication with the controller. The pressure sensor may be configured to generate the output signal.

In any of the aspects or embodiments described above and herein, the torque sensor assembly may include a piston, a housing, and a metering valve. The piston may be disposed in contact with the second ring gear. The piston may be configured for axial translation relative to the housing.

In any of the aspects or embodiments described above and herein, the piston, the housing, and the metering valve may form a fluid cavity. The pressure sensor may be connected in fluid communication with the fluid cavity.

In any of the aspects or embodiments described above and herein, each of the second ring gear and the second lateral gear may include a helical gear pattern.

In any of the aspects or embodiments described above and herein, the second ring gear extends between and to an inner radial side and an outer radial side. The helical gear pattern of the second ring gear may be disposed at the inner radial side.

In any of the aspects or embodiments described above and herein, the main gear may have a first diameter and each of the first lateral gear and the second lateral gear may have a second diameter. The first diameter may be greater than the second diameter.

In any of the aspects or embodiments described above and herein, the assembly may further include a planet carrier. The planet carrier may include a carrier plate and a plurality of shafts. Each shaft of the plurality of shafts may be connected to a respective one of the plurality of planet gears. The planet carrier plate may be connected to the output shaft.

According to another aspect of the present disclosure, an aircraft propulsion system includes a propeller, a gas turbine engine, a reduction gear box, and a torque sensor assembly. The propeller is configured for rotation about a rotational axis. The gas turbine engine includes a bladed turbine rotor and a shaft connected to the bladed turbine rotor. The reduction gearbox includes a planetary gear assembly connected to the shaft and the propeller. The planetary gear assembly is configured to drive the propeller at a reduced rotational speed relative to the shaft. The planetary gear assembly includes a sun gear, a plurality of planet gears, and a ring gear. The sun gear is connected to the shaft. Each planet gear of the plurality of planet gears includes a main gear and lateral gear. The main gear is engaged with the sun gear. The lateral gear is engaged with the ring gear. The ring gear is rotationally fixed relative to the rotational axis. The torque sensor assembly includes a piston contacting the ring gear.

In any of the aspects or embodiments described above and herein, the aircraft propulsion system may further include a controller connected in signal communication with the torque sensor assembly. The controller may include a processor in communication with a non-transitory memory storing instructions, which instructions when executed by the processor, cause the processor to: calculate a torque applied to the propeller by the planetary gear assembly using an output signal of the torque sensor assembly.

In any of the aspects or embodiments described above and herein, the instructions, when executed by the processor, may further cause the processor to control a rotation speed of the shaft using the calculated torque.

In any of the aspects or embodiments described above and herein, the main gear may have a first diameter and the lateral gear may have a second diameter. The first diameter may be greater than the second diameter.

In any of the aspects or embodiments described above and herein, each of the ring gear and the lateral gear may include a helical gear pattern.

According to another aspect of the present disclosure, an assembly for an aircraft propulsion system includes an output shaft, a planetary gear assembly, and a torque sensor. The planetary gear assembly is configured to drive rotation of the output shaft. The planetary gear assembly includes a sun gear, a plurality of planet gears, a first ring gear, and a second ring gear. The sun gear is rotatable about a rotational axis. Each planet gear of the plurality of planet gears includes a main gear, a first lateral gear, and a second lateral gear. The main gear is engaged with the sun gear, the first lateral gear is engaged with the first ring gear, and the second lateral gear is engaged with the second ring gear. The first ring gear and the second ring gear are rotationally fixed relative to the rotational axis. Each of the first ring gear, the second ring gear, the first lateral gear, and the second lateral gear includes a helical gear pattern. The torque sensor assembly contacts the second ring gear. The torque sensor assembly is configured to generate an output signal corresponding to an axial deflection of the second ring gear.

In any of the aspects or embodiments described above and herein, the torque sensor assembly may be disposed at an axial side of the second ring gear.

In any of the aspects or embodiments described above and herein, each of the first ring gear and the second ring gear may extend between and to an inner radial side and an outer radial side. The helical gear pattern may be disposed at the inner radial side.

In any of the aspects or embodiments described above and herein, the main gear may have a first diameter and each of the first lateral gear and the second lateral gear may have a second diameter. The first diameter may be greater than the second diameter.

In any of the aspects or embodiments described above and herein, the assembly may further include a planet carrier. The planet carrier may include a carrier plate and a plurality of shafts. Each shaft of the plurality of shafts may be connected to a respective one of the plurality of planet gears. The planet carrier plate may be connected to the output shaft.

The present disclosure, and all its aspects, embodiments and advantages associated therewith will become more readily apparent in view of the detailed description provided below, including the accompanying drawings.

DETAILED DESCRIPTION

Figure 1:
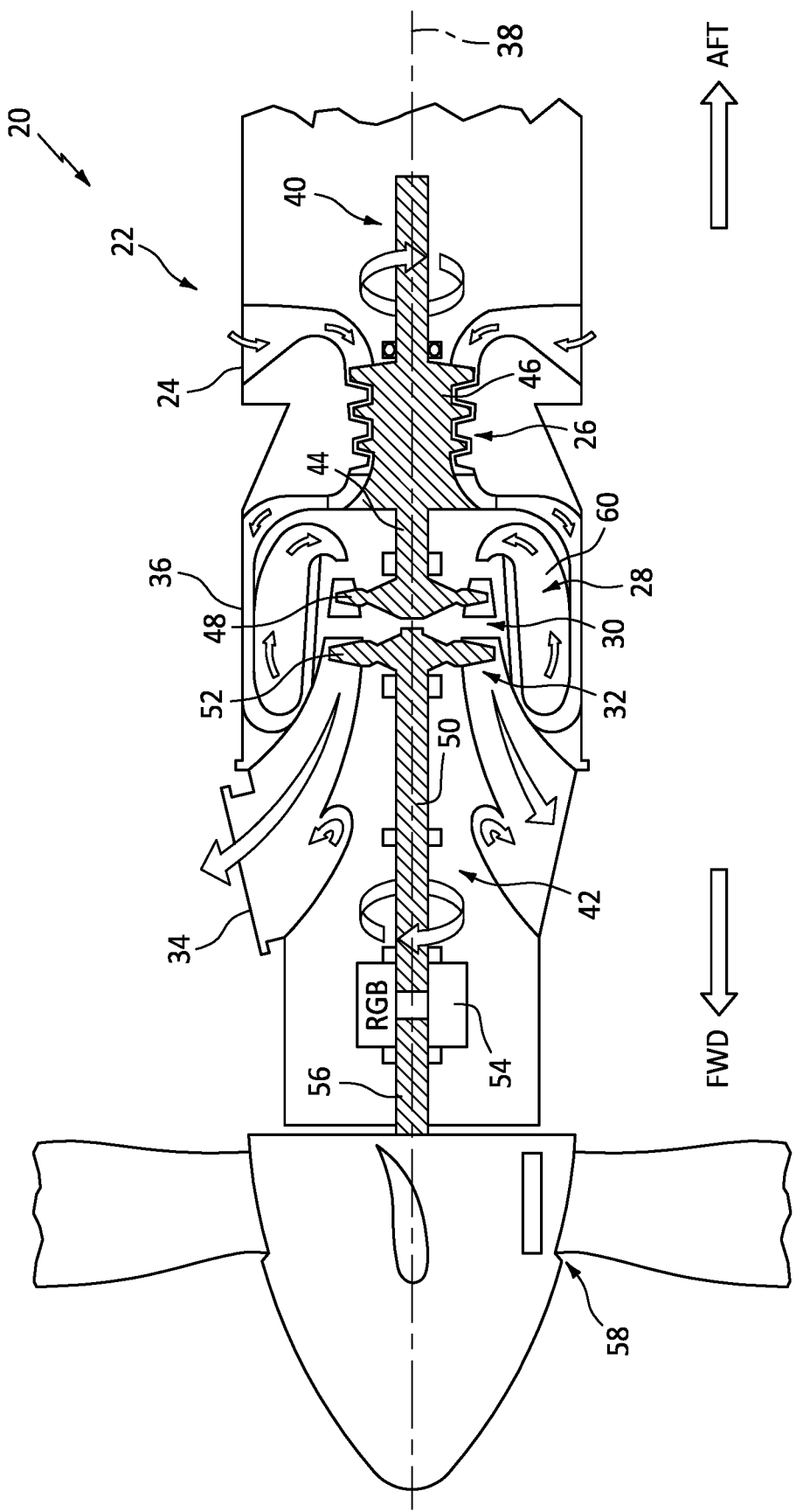
FIG. 1 schematically illustrates a side, cutaway view of an aircraft propulsion system, in accordance with one or more embodiments of the present disclosure.

FIG. 1 illustrates a propulsion system 20 configured for an aircraft. Briefly, the aircraft may be a fixed-wing aircraft (e.g., an airplane), a rotary-wing aircraft (e.g., a helicopter), a tilt-rotor aircraft, a tilt-wing aircraft, or any other aerial vehicle. Moreover, the aircraft may be a manned aerial vehicle or an unmanned aerial vehicle (UAV, e.g., a drone). The aircraft propulsion system 20 of FIG. 1 includes a gas turbine engine 22. However, the present disclosure is also applicable to propulsion systems which do not include gas turbine engines such as, but not limited to, a battery-electric propulsion system (e.g., an electric-motor driven propeller system).

FIG. 1 illustrates a side, cutaway view of the gas turbine engine 22. The gas turbine engine 22 of FIG. 1 is configured as a turboprop gas turbine engine, however, the present disclosure is not limited to turboprop gas turbine engines. It should be understood that aspects of the present disclosure may be equally applicable to other types of gas turbine engines including, but not limited to, a turboshaft gas turbine engine, a turbofan gas turbine engine, a turbojet gas turbine engine, or an open rotor gas turbine engine.

The gas turbine engine 22 of FIG. 1 includes an air inlet 24, a compressor 26, a combustor 28, a high-pressure turbine 30, a power turbine 32, an exhaust 34, and an engine static structure 36. The air inlet 24, the compressor 26, the combustor 28, the high-pressure turbine 30, the power turbine 32, and the exhaust 34 are arranged along an axial centerline 38 (e.g., a rotational axis) of the gas turbine engine 22. The engine static structure 36 may include, for example, one or more engine cases for the gas turbine engine 22. The engine static structure 36 may additionally include cowlings, bearing assemblies, and/or other structural components of the gas turbine engine 22. The one or more engine cases form, house, and/or structurally support one or more of the air inlet 24, the compressor 26, the combustor 28, the high-pressure turbine 30, the power turbine 32, and the exhaust 34.

Components of the gas turbine engine 22 of FIG. 1, such as components of the compressor 26, the high-pressure turbine 30, and the power turbine 32, are arranged as a first rotational assembly 40 (e.g., a high-pressure spool) and a second rotational assembly 42 (e.g., a power spool). The first rotational assembly 40 and the second rotational assembly 42 are mounted for rotation about the axial centerline 38 relative to the engine static structure 36. The gas turbine engine 22 of FIG. 1 has a "free turbine" configuration. The present disclosure, however, is not limited to free turbine gas turbine engine configurations.

The first rotational assembly 40 includes a first shaft 44, a bladed compressor rotor 46 for the compressor 26, and a bladed first turbine rotor 48 for the high-pressure turbine 30. The first shaft 44 interconnects the bladed compressor rotor 46 and the bladed first turbine rotor 48.

The second rotational assembly 42 includes a second shaft 50 (e.g., an input shaft), a bladed second turbine rotor 52 for the power turbine 32, a speed-changing gearbox 54, an output shaft 56, and a rotational load 58. The speed-changing gearbox 54 will be described herein with respect to a reduction gearbox (RGB) 54 configuration, however, the present disclosure is not limited in application to reduction gearboxes. The second shaft 50 is connected to the bladed power turbine rotor 52. The output shaft 56 is connected to the rotational load 58. The second shaft 50 and the output shaft 56 are mechanically coupled with the RGB 54. The RGB 54 is configured to drive the output shaft 56 at a reduced rotational speed relative to the second shaft 50. In other words, the RGB 54 is configured to facilitate a reduced speed ratio between the second shaft 50 and the output shaft 56 in driving engagement with the rotational load 58. The rotational load 58 of FIG. 1 is configured as a propeller. The present disclosure, however, is not limited to propellers for the rotational load 58.

During operation of the gas turbine engine 22 of FIG. 1, ambient air enters the gas turbine engine 22 through the air inlet 24 and is directed into the compressor 26. The ambient air is compressed by the bladed compressor rotor 46 and directed into a combustion chamber 60 of the combustor 28. Fuel is injected into the combustion chamber 60 and mixed with the compressed air to provide a fuel-air mixture. This fuel-air mixture is ignited, and combustion products thereof flow through and sequentially cause the bladed first turbine rotor 48 and the bladed second turbine rotor 52 to rotate. The rotation of the bladed first turbine rotor 48 and the bladed second turbine rotor 52 respectively drive rotation of the first rotational assembly 40 and the second rotational assembly 42. Rotation of the second rotational assembly 42 further drives rotation of the rotational load 58 (e.g., the propeller) of FIG. 1 by the RGB 54, as previously discussed, to provide propulsion (e.g., thrust) for the propulsion system 20. Combustion exhaust gas flowing past the bladed second turbine rotor 52 is directed out of the gas turbine engine 22 through the exhaust 34.

Figure 2:
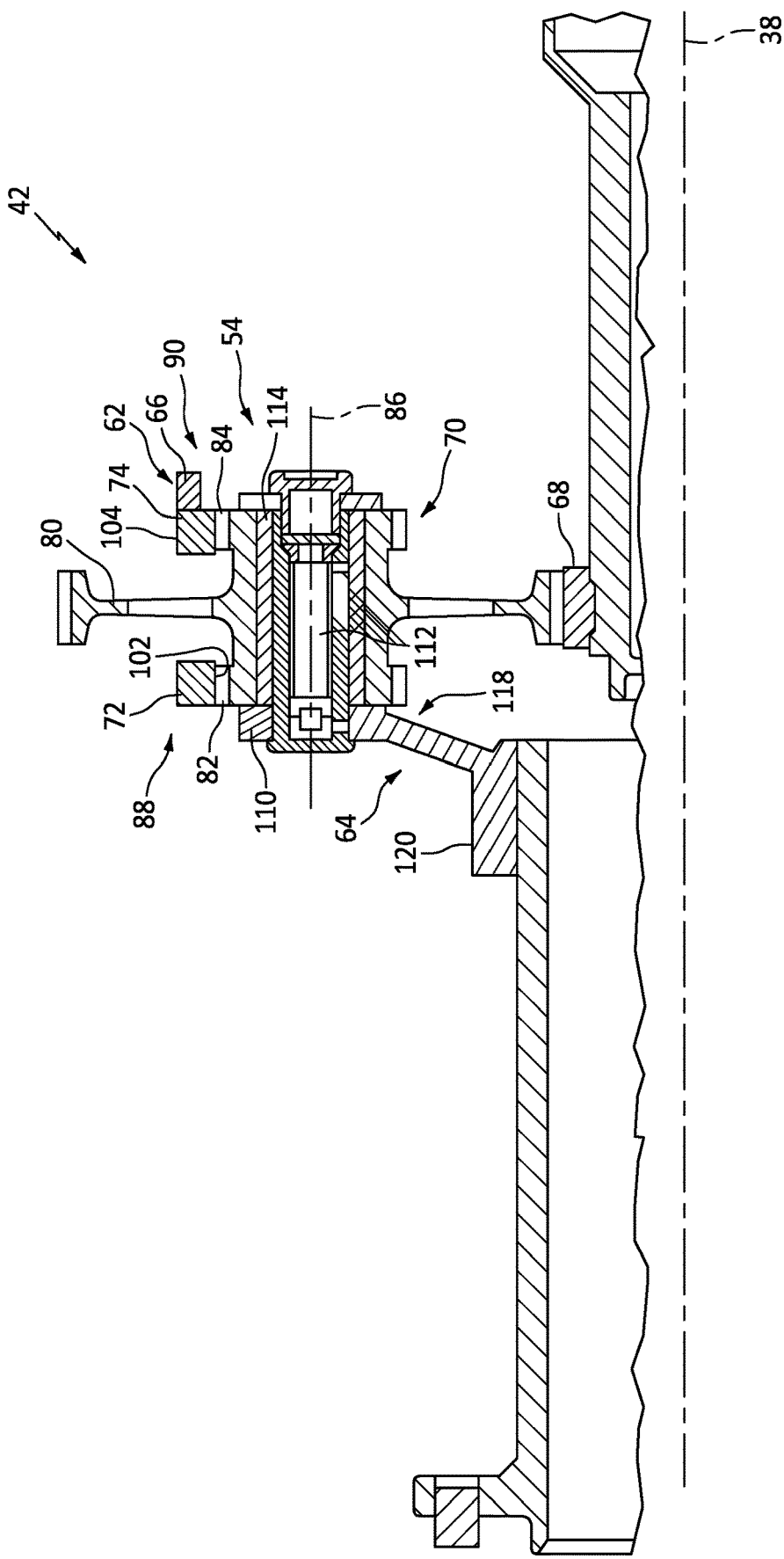
FIG. 2 illustrates a side, cutaway view of a portion of a rotational assembly for the aircraft propulsion system of FIG. 1, in accordance with one or more embodiments of the present disclosure.

FIG. 2 illustrates a side, cutaway view of a portion of the second rotational assembly 42 including the RGB 54. The RGB 54 of FIG. 2 includes a planetary gear assembly 62 (sometimes referred to as an "epicyclic gear assembly"), a planet carrier 64, and a torque sensor assembly 66. The planetary gear assembly 62 and the planet carrier 64 operably couple the second shaft 50 to the output shaft 56. The torque sensor assembly 66 is configured to measure a torque of the planetary gear assembly 62.

Figure 3:
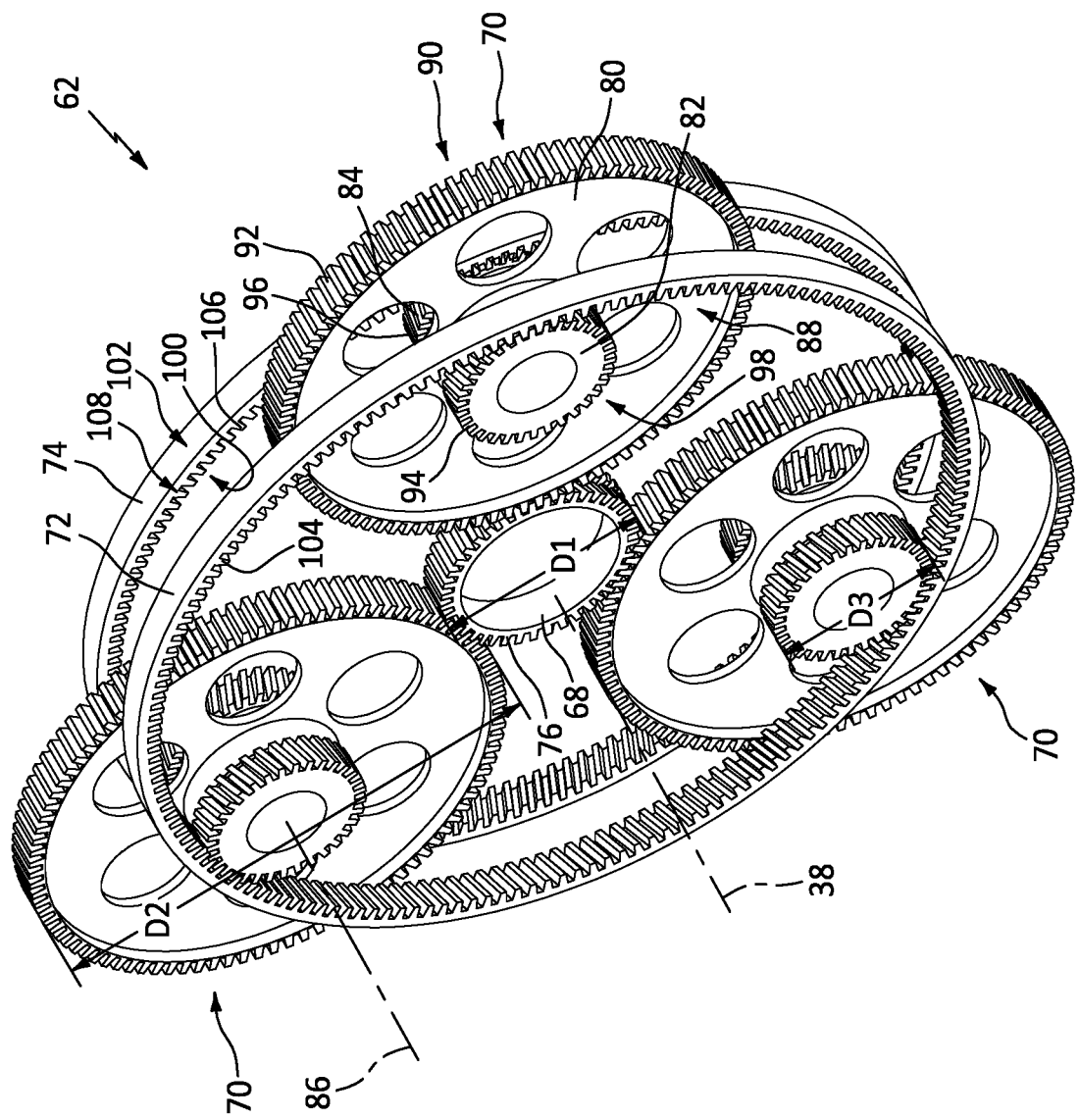
FIG. 3 illustrates a perspective view of a planetary gear assembly for the rotational assembly of FIG. 2, in accordance with one or more embodiments of the present disclosure.
Figure 4:
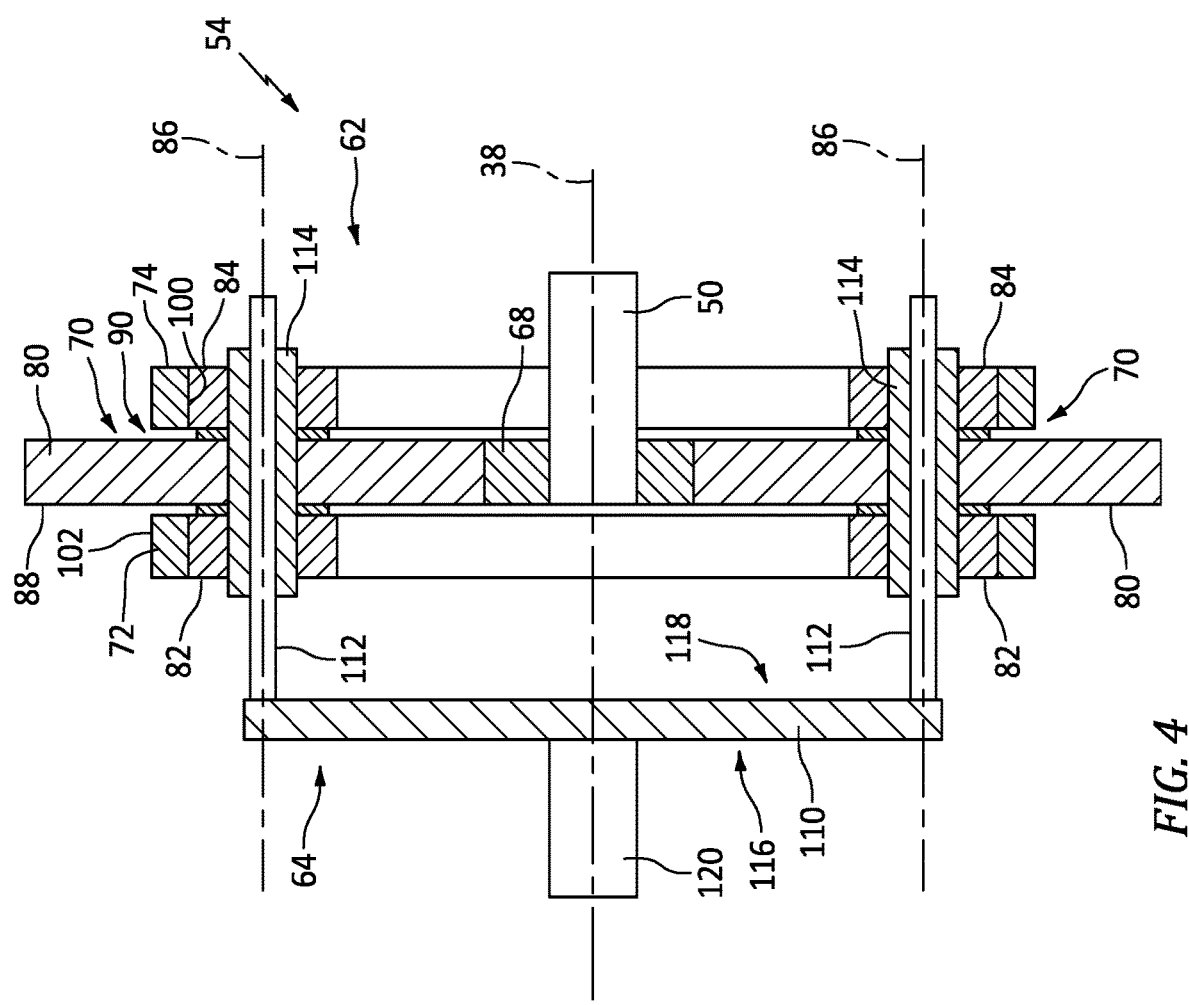
FIG. 4 illustrates a cutaway view of a portion of the planetary gear assembly for the rotational assembly of FIG. 2, in accordance with one or more embodiments of the present disclosure.

Referring to FIGS. 2-4, the planetary gear assembly 62 includes a sun gear 68, a plurality of planet gears 70, a first ring gear 72, and a second ring gear 74. FIG. 3 illustrates a perspective view of the planetary gear assembly 62. FIG. 4 illustrates a side, cutaway view of a portion of the planetary gear assembly 62.

The sun gear 68 is mounted on, formed by, or otherwise connected to the second shaft 50 (e.g., by one or more intermediate components). The sun gear 68 is configured to rotate with the second shaft 50 about the axial centerline 38. The sun gear 68 includes a plurality of gear teeth 76. The plurality of teeth 76 are arranged circumferentially about (e.g., completely around) the sun gear 68. The plurality of teeth 76 may form, for example, a spur gear configuration, a helical gear configuration, or a double-helical gear configuration, and the present disclosure is not limited to any particular gear configuration for the sun gear 68 and its plurality of gear teeth 76. The sun gear 66 has a diameter D1 (e.g., extending perpendicular to the axial centerline 38).

Each of the plurality of planet gears 70 includes a main gear 80, a first lateral gear 82, and a second lateral gear 84. The planetary gear assembly 62 of FIG. 3 includes three planet gears 70, however, the present disclosure is not limited to any particular number of planet gears for the planet gear assembly 62.

The main gear 80 extends circumferentially about (e.g., completely around) a planet gear axis 86. The main gear 80 has a diameter D2 (e.g., extending perpendicular to the planet gear axis 86). The diameter D2 may be greater than the diameter D1 of the sun gear 66. The main gear 80 extends (e.g., along the planet gear axis 86) between and to a first lateral side 88 of the main gear 80 and a second lateral side 90 of the main gear 80. The main gear 80 includes a plurality of gear teeth 92. The plurality of teeth 92 are arranged circumferentially about (e.g., completely around) the main gear 80. The plurality of teeth 92 mesh with (e.g., are operably engaged with) the plurality of teeth 76. The plurality of teeth 92 may form, for example, a spur gear configuration, a helical gear configuration, or a double-helical gear configuration matching the plurality of gear teeth 76, and the present disclosure is not limited to any particular gear configuration for the main gear 80 and its plurality of gear teeth 92.

Each of the first lateral gear 82 and the second lateral gear 84 extends circumferentially about (e.g., completely around) a planet gear axis 86. Each of the first lateral gear 82 and the second lateral gear 84 has a diameter D3 (e.g., extending perpendicular to the planet gear axis 86). The diameter D3 may be less than the diameter D1 of the sun gear 66 and/or the diameter D2 of the main gear 80. The first lateral gear 82 is disposed at (e.g., on, adjacent, or proximate) the first lateral side 88. The second lateral gear 84 is disposed at (e.g., on, adjacent, or proximate) the second lateral side 90. The first lateral gear 82 includes a plurality of gear teeth 94 arranged circumferentially about (e.g., completely around) the first lateral gear 82. The second lateral gear 84 includes a plurality of gear teeth 96 arranged circumferentially about (e.g., completely around) the second lateral gear 84. The plurality of gear teeth 94 and the plurality of gear teeth 96 cooperatively form a double helical gear pattern 98 (sometimes referred to as a "herringbone" pattern) of the first lateral gear 82 and the second lateral gear 84. The plurality of gear teeth 94 for the first lateral gear 82 form a helical gear pattern and the plurality of gear teeth 96 for the second lateral gear 84 form an opposing helical pattern. For example, the plurality of gear teeth 94 are angled in opposite directions relative to the plurality of teeth 96.

Each of the first ring gear 72 and the second ring gear 74 extend circumferentially about (e.g., completely around) the axial centerline 38. The first ring gear 72 is spaced (e.g., laterally spaced) from the second ring gear 74 along the axial centerline 38. Each of the first ring gear 72 and the second ring gear 74 extends between and to an inner radial side 100 of the respective ring gear 72, 74 and an outer radial side 102 of the respective ring gear 72, 74. The first ring gear 72 includes a plurality of gear teeth 104 arranged circumferentially about (e.g., completely around) the first ring gear 72 on the inner radial side 100. The second ring gear 74 includes a plurality of gear teeth 106 arranged circumferentially about (e.g., completely around) the second ring gear 74 on the inner radial side 100. The plurality of gear teeth 104 and the plurality of gear teeth 106 cooperatively form a double helical gear pattern 108 of the first ring gear 72 and the second ring gear 74 matching the double helical pattern 98 of the first lateral gear 82 and the second lateral gear 84. The plurality of gear teeth 104 for the first ring gear 72 form a helical gear pattern and the plurality of gear teeth 106 for the second ring gear 74 form an opposing helical pattern. For example, the plurality of gear teeth 104 are angled in opposite directions relative to the plurality of teeth 106. The plurality of teeth 104 mesh with (e.g., are operably engaged with) the plurality of teeth 94. The plurality of teeth 106 mesh with (e.g., are operably engaged with) the plurality of teeth 96. Each of the first ring gear 72 and the second ring gear 74 may be rotationally fixed relative to the axial centerline 38. For example, the first ring gear 72 and the second ring gear 74 may be fixedly mounted to the engine static structure 36 (see FIG. 1) or another fixed structure of the propulsion system 20 (see FIG. 1).

FIGS. 2 and 4 illustrate portions of the planet carrier 64. The planet carrier 64 includes a carrier plate 110 and a plurality of planet shafts 112. The planet carrier 64 may further include a plurality of bearings 114.

The carrier plate 110 extends circumferentially about (e.g., completely around) the axial centerline 38. The carrier plate 110 extends between and to a first lateral side 116 of the carrier plate 110 and a second lateral side 118 of the carrier plate 110. The first lateral side 116 is coupled to the output shaft 56. The carrier plate 110 of FIG. 4 includes a connector 120 at (e.g., on, adjacent, or proximate) the first lateral side 116. The connector 120 is mounted to the output shaft 56 (e.g., by a splined connection) and configured to drive rotation of the output shaft 56 based on rotation of the planet carrier 64. Alternatively, however, the output shaft 56 may be directly coupled to or formed by the carrier plate 110.

The plurality of planet shafts 112 extend outward from the second lateral side 118. Each planet shaft 112 is rotatably coupled to a respective one of the planet gears 70. For example, the planet carrier 64 may include three planet shafts 112 corresponding to the three respective planet gears 70 of the planetary gear assembly 62 of FIGS. 2-4. Each planet shaft 112 extends (e.g., axially extends) through the respective planet gear 70 along the planet gear axis 86 for the respective planet gear 70. Thus, each planet gear 70 is mounted on a respective one of the planet shafts 112 for rotation about the respective planet gear axis 86.

The planet carrier 64 may further include the plurality of bearings 114, with each bearing 114 disposed between each planet shaft 112 and each respective planet gear 70. Each bearing 114 is extends circumferentially about (e.g., completely around) a respective one of the planet shafts 112 to rotatably support the respective one of the planet gears 70. Each bearing 114 may be fixedly mounted onto a respective one of the planet shafts 112. The plurality of bearings 114 may be configured, for example, as journal bearings (e.g., plain bearings), oil film bearings, or the like.

During operation of the RGB 54, the second shaft 50 drives rotation of the sun gear 68 about the axial centerline 38. The sun gear 68 effects rotation of the plurality of planet gears 70 (e.g., by engagement with the main gear 80) about the respective planet gear axis 86 of each planet gear 70. Rotation of the planet gears 70 causes the planet gears 70 to circumferentially travel along the first ring gear 72 and the second ring gear 74 (e.g., by engagement with first lateral gear 82 and the second lateral gear 84), thereby effecting rotation of the planet carrier 64 and driving the output shaft 56 and the rotational load 58. Accordingly, the RGB 54 drives the output shaft 56 at a reduced rotational speed relative to the second shaft 50 (e.g., a reduced speed ratio).

Figure 5:
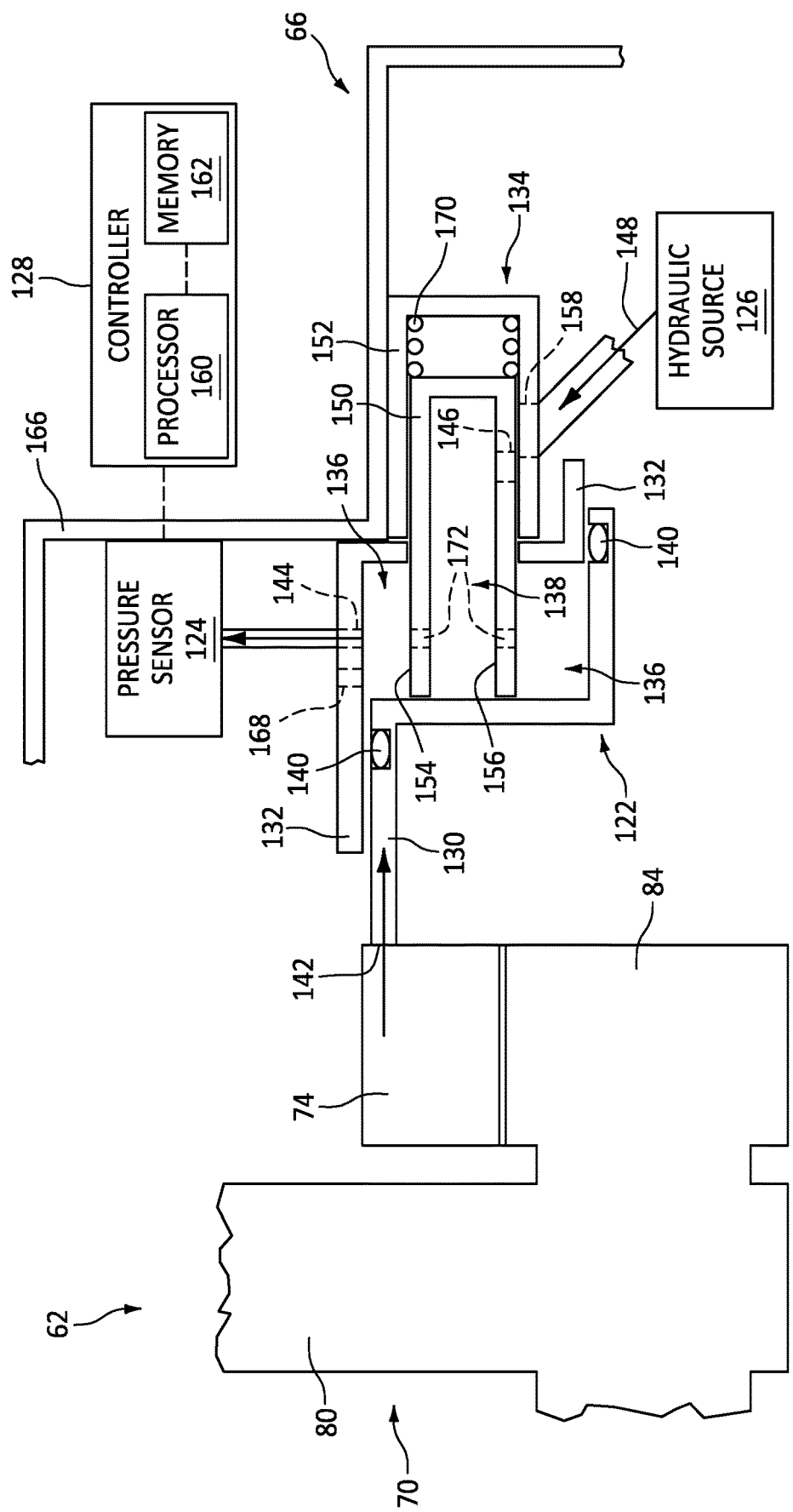
FIG. 5 schematically illustrates a cutaway view of a torque sensor for a planetary gear assembly, in accordance with one or more embodiments of the present disclosure.

FIG. 5 illustrates a cutaway view of the torque sensor assembly 66 and a portion of the planetary gear assembly 62 (e.g., a circumferential portion of the torque sensor assembly 66 and the planetary gear assembly 62). More particularly, FIG. 5 illustrates the second ring gear 74 and a portion of one of the planet gears 70 including the main gear 80 and the second lateral gear 84. The torque sensor assembly 66 of FIG. 5 includes a torque sensor 122, a pressure sensor 124, a hydraulic source 126, and a controller 128.

The torque sensor 122 includes a piston 130, a housing 132, and a metering valve 134. As will be discussed in further detail, components of the torque sensor 122 form a first fluid cavity 136 and a second fluid cavity 138. The torque sensor 122 may additionally include one or more fluid seals 140.

The piston 130 extends circumferentially about (e.g., completely around) the axial centerline 38 (e.g., the piston 130 is an annular body). The piston 130 is configured for translation (e.g., axial translation with respect to the axial centerline 38) relative to the housing 132. The piston 130 of FIG. 5 includes a distal end 142 disposed at (e.g., on, adjacent, or proximate) the second ring gear 74 (e.g., an axial end of the second ring gear 74). However, the distal end 142 may alternatively be disposed at (e.g., on, adjacent, or proximate) the first ring gear 72 (e.g., an axial end of the first ring gear 72). The piston 130 forms at least a portion of the first fluid cavity 136 and the second fluid cavity 138.

The housing 132 extends circumferentially about (e.g., completely around) the axial centerline 38 (e.g., the housing 132 is an annular body) at (e.g., on, adjacent, or proximate) the piston 130. The housing 132 is fixed relative to the axial centerline 38. For example, the housing 132 may be mounted to a gearbox housing 166 or other fixed structure of the RGB 54 (see FIG. 1). The housing 132 further forms at least a portion of the first fluid cavity 136. The housing 132 of FIG. 5. The housing 132 forms a first aperture 144 and at least one second aperture 168 through the housing 132. The pressure first aperture 144 is connected in fluid communication with and between the first fluid cavity 136 and the pressure sensor 124. The second aperture 168 is connected in fluid communication with the first fluid cavity 136 and extends through the housing 132 to an exterior of the housing 132.

The metering valve 134 includes a translating body portion 150, a fixed body portion 152, and a biasing member 170. The translating body portion 150 is positioned at (e.g., on, adjacent, or proximate) the piston 130. The translating body portion 150 is configured to translate (e.g., axially translate) with the piston 130 relative to the housing 132 and the fixed body portion 152. The translating body portion 150 forms at least a portion of the first fluid cavity 136 and the second fluid cavity 138. For example, the first fluid cavity 136 of FIG. 5 is formed by an exterior 154 of the translating body portion 150 and the second fluid cavity 138 of FIG. 5 is formed by an interior 156 of the translating body portion 150. The fixed body portion 152 forms at least one first metering aperture 146 through the fixed body portion 152. The first metering aperture 146 is connected in fluid communication with the hydraulic source 126. The first metering aperture 146 is configured to selectively direct a hydraulic fluid 148 (e.g., oil) from the hydraulic source 126 to the second fluid cavity 138. The translating body portion 150 forms a second metering aperture 158 through the translating body portion 150, for example, from the exterior 154 to the interior 156. The second metering aperture 158 is configured to be selectively positioned with the first metering aperture 146 to direct the hydraulic fluid 148 from the hydraulic source 126 to the second fluid cavity 138. For example, the translating body portion 150 may be axially translatable with the piston 130 between a first axial position and a second axial position. In the first axial position, the first metering aperture 146 may be disposed coincident with (e.g., aligned with) the second metering aperture 158 to direct the hydraulic fluid 148 from the hydraulic source 126 into the second fluid cavity 138. In the second axial position, the first metering aperture 146 may be separated from (e.g., not aligned with) the second metering aperture 158 such that the hydraulic fluid 148 is not directed to the second fluid cavity 138. For example, in the second axial position, the translatable body portion 150 (e.g., the exterior 154) may obstruct or otherwise prevent the flow of the hydraulic fluid 148 to the second fluid cavity 138. The translating body portion 150 further forms at least one outlet aperture 172 through the translating body portion 152 (e.g., from the exterior 154 to the interior 156). The at least one outlet aperture 172 is connected in fluid communication with the first fluid cavity 136 and the second fluid cavity 138. The biasing member 170 (e.g., a spring) is disposed between the translating body portion 150 and the fixed body portion 152. The biasing member 170 is configured to bias the translating body portion 152 toward the piston 130 and, therefore, to bias the piston 130 toward the second ring gear 74.

The one or more fluid seals 140 may be positioned between and in sealing contact with the piston 130 and the housing 132. The one or more fluid seals 140 may facilitate sealing of the first fluid cavity 136 as the piston 130 translates (e.g., axially translates) relative to the housing 132.

The pressure sensor 124 is connected in fluid communication with the first fluid cavity 136. The pressure sensor 124 may be connected in fluid communication with the first fluid cavity 136 by the pressure sensing aperture 132 and any suitable fluid conduit (e.g., pipe, hose, tube, etc.). The pressure sensor 124 is configured to measure a pressure of a hydraulic fluid (e.g., oil) within the first fluid cavity 136 and generate an output signal (e.g., an electrical and/or electronic output signal) proportional to the measured hydraulic fluid pressure. For example, the pressure sensor 124 may be configured as a pressure transducer. However, the present disclosure is not limited to any particular configuration of the pressure sensor 124.

The hydraulic source 126 is configured to supply and direct the hydraulic fluid 148 to the second fluid cavity 138. The hydraulic source 126 may be any suitable system or assembly for supplying a pressurized fluid (e.g., the hydraulic fluid 148) to the second fluid cavity 138. The hydraulic source 126 may be formed, for example, by a hydraulic and/or lubrication system of the propulsion system 20 or its gas turbine engine (see FIG. 1). The hydraulic source 126 may include or otherwise be formed by a fluid pump, a fluid accumulator, or other fluid pressure source.

The controller 128 is connected in communication (e.g., signal communication) with the pressure sensor 124 to receive signals therefrom to perform the functions described herein. The controller 128 includes a processor 160 connected in signal communication with memory 162. The processor 160 may include any type of computing device, computational circuit, processor(s), CPU, computer, or the like capable of executing a series of instructions that are stored in the memory 162. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the torque sensor assembly 66 to accomplish the same algorithmically and/or by coordination of torque sensor assembly 66 components. The memory 162 may include a single memory device or a plurality of memory devices; e.g., a computer-readable storage device that can be read, written, or otherwise accessed by a general purpose or special purpose computing device, including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly or indirectly coupled to the controller 128. The controller 128 may include, or may be in communication with, an input device that enables a user to enter data and/or instructions, and may include, or be in communication with, an output device configured, for example to display information (e.g., a visual display or a printer), or to transfer data, etc. Communications between the controller 128 and the torque sensor assembly 66 and its components (e.g., the pressure sensor 124) may be via a hardwire connection or via a wireless connection. A person of skill in the art will recognize that portions of the controller 128 may assume various forms (e.g., digital signal processor, analog device, etc.) capable of performing the functions described herein.

The controller 128 may form or otherwise be part of an electronic engine controller (EEC) for the propulsion system 20. The EEC may control operating parameters of the gas turbine engine 22 including, but not limited to, fuel flow, stator vane position (e.g., variable compressor inlet guide vane (IGV) position), compressor air bleed valve position, rotational load 58 (e.g., propeller) rotation speed, etc. so as to control an engine power and/or thrust of the gas turbine engine 22. In some embodiments, the EEC may be part of a full authority digital engine control (FADEC) system for the propulsion system 20.

During operation of the planetary gear assembly 62, the meshed helical gear patterns of the second ring gear 74 and the second lateral gear 84 of each planet gear 70 may result in a limited axial displacement and/or deflection of the second ring gear 74 relative to the axial centerline 38 (e.g., an axial displacement and/or deflection related to an axial position of the second ring gear 74 with no torque applied). This axial displacement may be similarly experienced by the first ring gear 72. The amount of axial displacement of the second ring gear 74 may be understood to correspond with (e.g., to be proportional to) a torque of the planetary gear assembly 62 (e.g., a torque applied by the planetary gear assembly 62 to the output shaft 56; see FIGS. 1 and 2). Axial displacement of the second ring gear 74 may cause the second ring gear 74 to abut and apply an axial force 164 to the piston 130 (e.g., the distal end 142), thereby causing the piston 130 to translate and compress the hydraulic fluid within the first fluid cavity 136, increasing a fluid pressure of this hydraulic fluid. The annular configuration of the piston 130 provides an enlarged and uniform contact surface area with the second ring gear 74 to facilitate greater accuracy of the first fluid cavity pressure to torque relationship and, therefore, improved accuracy of the torque sensor assembly 66. The translating body portion 150, translating with the piston 130, may cause the second metering aperture 158 to become aligned with or further aligned with the first metering aperture 146, thereby directing the hydraulic fluid 148 from the hydraulic source 126 into the second fluid cavity 138 and/or increasing a flow rate of the hydraulic fluid 148 from the hydraulic source 126 into the second fluid cavity 138. This hydraulic fluid 148 may, in turn, be directed into the first fluid cavity 136 through the at least one outlet aperture 172. The hydraulic fluid 148 may be directed out of the first fluid cavity 136 through the at least one second aperture 168 to an interior cavity of the RGB 54 (see FIG. 2). This hydraulic fluid 148 exiting the at least one second aperture 168 may collect within the RGB 54 (e.g., within a sump of the RGB 54) and be returned to a lubrication system for the RGB 54 (e.g., by an oil scavenging assembly). The axial displacement of the second ring gear 74, the biasing force of the biasing member 170, and the hydraulic fluid 148 flow from the hydraulic source 126 will cause the translating body portion 150 to reach an equilibrium position in which a fluid pressure of the first fluid cavity 136 is equal to or substantially equal to a fluid pressure of the second fluid cavity 138.

The pressure output signal from the pressure sensor 124 corresponds to (e.g., is proportional to or otherwise representative of) the axial deflection of the second ring gear 74 and, therefore, the torque of the planetary gear assembly 62 (e.g., the torque applied by the planetary gear assembly 62 to the output shaft 56. The controller 128 may calculate or otherwise determine the planetary gear assembly 62 torque using the pressure output signal based on a known relationship between the fluid pressure in the first fluid cavity 136 (e.g., the measured fluid pressure) and the planetary gear assembly 62 torque. Routine experimentation and/or analysis may be performed by a person of ordinary skill in the art to determine a relationship between the planetary gear assembly 62 torque and the first fluid cavity pressure for a particular propulsion system, gas turbine engine, planetary gear assembly, and torque sensor in accordance with and as informed by one or more aspects of the present disclosure. The controller 128 may use the determined planetary gear assembly 62 torque for control of propulsion system 20 and/or gas turbine engine 22 functions. Additionally or alternatively, the controller 128 may transmit the determined planetary gear assembly 62 torque to one or more other control systems for use in control of propulsion system 20 and/or gas turbine engine 22 functions. For example, the controller 128 may use the determined planetary gear assembly 62 torque to control a rotational speed of the second shaft 50 (e.g., by controlling fuel flow and/or propeller blade pitch). The controller 128 may use the determined planetary gear assembly 62 torque in the calculation of other propulsion system 20 and/or gas turbine engine 22 operational parameters such as, but not limited to, gas turbine engine 22 power output.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An assembly for an aircraft propulsion system, the assembly comprising:
   an output shaft;
   a planetary gear assembly configured to drive rotation of the output shaft, the planetary gear assembly including a sun gear, a plurality of planet gears, a first ring gear, and a second ring gear,
   the sun gear is rotatable about a rotational axis,
   each planet gear of the plurality of planet gears includes a main gear, a first lateral gear, and a second lateral gear, the main gear is engaged with the sun gear, the first lateral gear is engaged with the first ring gear, and the second lateral gear is engaged with the second ring gear, and
the first ring gear is axially spaced from the second ring gear relative to the rotational axis;
a torque sensor assembly contacting the second ring gear, the torque sensor assembly is configured to generate an output signal corresponding to an axial deflection of the second ring gear, the torque sensor assembly including a piston, a housing, and a metering valve, the piston is disposed in contact with the second ring gear, the piston configured for axial translation relative to the housing, and the piston forming at least a portion of a first fluid cavity and a second fluid cavity, the metering valve disposed between the first fluid cavity and the second fluid cavity;
a controller connected in signal communication with the torque sensor assembly, the controller includes a processor in communication with a non-transitory memory storing instructions, which instructions when executed by the processor, cause the processor to:
calculate a torque applied to the output shaft by the planetary gear assembly using the output signal;
a pressure sensor connected in signal communication with the controller, the pressure sensor configured to generate the output signal, the pressure sensor connected in fluid communication with the first fluid cavity; and
a hydraulic source configured to supply and direct hydraulic fluid to the second fluid cavity.

2. The assembly of claim 1, wherein the torque sensor assembly is disposed at an axial side of the second ring gear.

3. The assembly of claim 1, wherein the first ring gear and the second ring gear are rotationally fixed relative to the rotational axis.

4. The assembly of claim 1, wherein each of the second ring gear and the second lateral gear includes a helical gear pattern.

5. The assembly of claim 4, wherein the second ring gear extends between and to an inner radial side and an outer radial side, and the helical gear pattern of the second ring gear is disposed at the inner radial side.

6. The assembly of claim 1, wherein the main gear has a first diameter and each of the first lateral gear and the second lateral gear has a second diameter, and the first diameter is greater than the second diameter.

7. The assembly of claim 1, further comprising a planet carrier, the planet carrier includes a carrier plate and a plurality of shafts, each shaft of the plurality of shafts is connected to a respective one of the plurality of planet gears, the planet carrier plate is connected to the output shaft.

8. The assembly of claim 1, wherein the housing is disposed radially outboard of and extends circumferentially about the piston, the housing forming at least a portion of the first fluid cavity.

9. An aircraft propulsion system comprising:
a propeller configured for rotation about a rotational axis;
a gas turbine engine including a bladed turbine rotor and a shaft connected to the bladed turbine rotor;
a reduction gearbox including a planetary gear assembly connected to the shaft and the propeller, the planetary gear assembly configured to drive the propeller at a reduced rotational speed relative to the shaft, the planetary gear assembly including a sun gear, a plurality of planet gears, and a ring gear,
the sun gear is connected to the shaft;
each planet gear of the plurality of planet gears includes a main gear and lateral gear, the main gear is engaged with the sun gear, the lateral gear is engaged with the ring gear, and
the ring gear is rotationally fixed relative to the rotational axis;
a torque sensor assembly including a piston, a housing, a translating body portion, and a metering valve, the piston contacting the ring gear, the piston configured for axial translation relative to the housing, the piston forming at least a portion of a first fluid cavity and a second fluid cavity, and the translating body portion forming at least a portion of the first fluid cavity and the second fluid cavity;
a pressure sensor configured to generate an output signal, the pressure sensor connected in fluid communication with the first fluid cavity; and
a hydraulic source configured to supply and direct hydraulic fluid to the second fluid cavity.

10. The aircraft propulsion system of claim 9, further comprising a controller connected in signal communication with the pressure sensor, the controller includes a processor in communication with a non-transitory memory storing instructions, which instructions when executed by the processor, cause the processor to:
calculate a torque applied to the propeller by the planetary gear assembly using an output signal of the pressure sensor.

11. The aircraft propulsion system of claim 10, wherein the instructions, when executed by the processor, further cause the processor to control a rotation speed of the shaft using the calculated torque.

12. The aircraft propulsion system of claim 9, wherein the main gear has a first diameter and the lateral gear has a second diameter, and the first diameter is greater than the second diameter.

13. The aircraft propulsion system of claim 9, wherein each of the ring gear and the lateral gear includes a helical gear pattern.

14. The aircraft propulsion system of claim 9, wherein the translating body portion further forms at least one outlet aperture through the translating body portion, and the at least one outlet aperture is connected in fluid communication with the first fluid cavity and the second fluid cavity.

15. An assembly for an aircraft propulsion system, the assembly comprising:
an output shaft;
a planetary gear assembly configured to drive rotation of the output shaft, the planetary gear assembly including a sun gear, a plurality of planet gears, a first ring gear, and a second ring gear,
the sun gear is rotatable about a rotational axis,
each planet gear of the plurality of planet gears includes a main gear, a first lateral gear, and a second lateral gear, the main gear is engaged with the sun gear, the first lateral gear is engaged with the first ring gear, and the second lateral gear is engaged with the second ring gear, and
the first ring gear and the second ring gear are rotationally fixed relative to the rotational axis, each of the first ring gear, the second ring gear, the first lateral gear, and the second lateral gear includes a helical gear pattern; and
a torque sensor assembly contacting the second ring gear, the torque sensor assembly is configured to generate an output signal corresponding to an axial deflection of the second ring gear, the torque sensor assembly including a piston, a housing, a translating body portion and a metering valve, the piston is disposed in contact with the second ring gear, the piston and the translating body portion each configured for axial translation relative to the housing, the piston and the translating body portion each forming at least a portion of a first fluid cavity and a second fluid cavity and the translating body portion having at least one outlet aperture configured to allow fluid communication between the first fluid cavity and the second fluid cavity.

16. The assembly of claim 15, wherein the torque sensor assembly is disposed at an axial side of the second ring gear.

17. The assembly of claim 15, wherein each of the first ring gear and the second ring gear extend between and to an inner radial side and an outer radial side, and the helical gear pattern is disposed at the inner radial side.

18. The assembly of claim 15, wherein the main gear has a first diameter and each of the first lateral gear and the second lateral gear has a second diameter, and the first diameter is greater than the second diameter.

19. The assembly of claim 15, further comprising a planet carrier, the planet carrier includes a carrier plate and a plurality of shafts, each shaft of the plurality of shafts is connected to a respective one of the plurality of planet gears, the planet carrier plate is connected to the output shaft.

* * * * *